United States Patent
Chen et al.

(10) Patent No.: US 9,860,171 B2
(45) Date of Patent: Jan. 2, 2018

(54) LARGE SCALE MESSAGE ROUTING IN A DISTRIBUTED NETWORK

(71) Applicant: International Business Machines Corporation, Armonk, NY (US)

(72) Inventors: Li-Ju Chen, Taipei (TW); Cheng-Ta Lee, Taipei (TW); Jeffrey C. H. Liu, Taipei (TW); Joey H. Y. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 14/693,385

(22) Filed: Apr. 22, 2015

(65) Prior Publication Data

US 2015/0350079 A1    Dec. 3, 2015

(30) Foreign Application Priority Data

May 30, 2014   (TW) .............................. 103119183 A

(51) Int. Cl.
| | |
|---|---|
| *G06F 15/173* | (2006.01) |
| *H04L 12/743* | (2013.01) |
| *H04L 12/707* | (2013.01) |
| *H04L 29/08* | (2006.01) |
| *H04W 40/20* | (2009.01) |
| *H04L 12/715* | (2013.01) |

(52) U.S. Cl.
CPC .......... *H04L 45/7453* (2013.01); *H04L 45/24* (2013.01); *H04L 67/2895* (2013.01); *H04L 45/46* (2013.01); *H04W 40/20* (2013.01)

(58) Field of Classification Search
CPC ...... H04L 45/24; H04L 45/46; H04L 45/7453; H04L 67/2895; H04W 40/20
See application file for complete search history.

(56) References Cited

U.S. PATENT DOCUMENTS

| | | | |
|---|---|---|---|
| 5,119,373 A * | 6/1992 | Fredricsson ............ | H04L 12/43 370/458 |
| 7,865,550 B2 | 1/2011 | Lobban et al. | |
| 8,073,978 B2 | 12/2011 | Sengupta et al. | |
| 8,095,600 B2 | 1/2012 | Hasha et al. | |
| 8,301,654 B2 | 10/2012 | Kodama et al. | |
| 8,321,578 B2 | 11/2012 | Thompson et al. | |
| 8,495,130 B2 * | 7/2013 | Maenpaa .............. | H04L 67/104 709/201 |
| 8,566,423 B2 | 10/2013 | Banks et al. | |

(Continued)

OTHER PUBLICATIONS

Arianfar, "Optimizing Publish/Subscribe Systems with Congestion Handling," Helsinki University of Technology Master's Thesis, Jun. 18, 2008, 72 Pages, Department of Computer Science and Engineering.

(Continued)

*Primary Examiner* — Mohamed Wasel
(74) *Attorney, Agent, or Firm* — Robert C. Bunker

(57) ABSTRACT

Message routing is implemented by a computer device. A global ring is connected via a network, wherein the global ring is associated with a distributed hash table (DHT) and includes a plurality of nodes which are divided exclusively into groups in advance. A first group of nodes is determined from the plurality of grouped nodes. Using the DHT for a message to be routed, a first node is located from the first group of nodes, as a routing destination.

12 Claims, 5 Drawing Sheets

(56) References Cited

U.S. PATENT DOCUMENTS

| | | | |
|---|---|---|---|
| 2004/0054807 A1* | 3/2004 | Harvey | H04L 12/56 709/243 |
| 2004/0085329 A1* | 5/2004 | Xu | H04L 67/104 345/629 |
| 2004/0249970 A1* | 12/2004 | Castro | H04L 29/12009 709/238 |
| 2008/0130516 A1* | 6/2008 | You | H04L 67/104 370/254 |
| 2008/0317061 A1* | 12/2008 | Dake | H04L 12/403 370/452 |
| 2009/0092144 A1* | 4/2009 | Wepiwe | H04L 12/42 370/406 |
| 2010/0228798 A1* | 9/2010 | Kodama | G06F 17/30241 707/822 |
| 2010/0262717 A1 | 10/2010 | Critchley et al. | |
| 2010/0332579 A1* | 12/2010 | Sengupta | G06F 17/30864 709/201 |
| 2011/0307603 A1 | 12/2011 | Ishikawa | |
| 2012/0246337 A1 | 9/2012 | Ross | |
| 2012/0300676 A1 | 11/2012 | Welin et al. | |
| 2012/0317275 A1* | 12/2012 | Lee | H04L 67/104 709/224 |
| 2013/0318222 A1* | 11/2013 | Luong | G06F 17/30 709/223 |

OTHER PUBLICATIONS

Baldoni et al., "Distributed Event Routing in Publish/Subscribe Communication Systems: a Survey," Universit'a di Roma 'La Sapienza', 2005, 27 Pages, Dipartimento di Informatica e Sistemistica.

Bender et al., "A Comparative Study of Pub/Sub Methods in Structured P2P Networks," Databases, Information Systems, and Peer-to-Peer Computing, 2007, p. 385-396, LNCS vol. 4125, Springer-Verlag.

Chen et al., "Method of Message Routing for a distributed computing system," English Translation Application and Drawings, Filed on May 30, 2014, p. 1-30, TW Patent Application Serial No. 103119183.

Tam et al., "Building Content-Based Publish/Subscribe Systems with Distributed Hash Tables," Databases, Information Systems, and Peer-to-Peer Computing, 2004, p. 138-152, LNCS vol. 2944, Springer-Verlag.

* cited by examiner

LARGE SCALE MESSAGE ROUTING IN A DISTRIBUTED NETWORK

This application is based on and claims the benefit of priority from Taiwan Patent Application 103119183, filed on May 30, 2014.

BACKGROUND

The invention generally relates to message routing in a distributed computing system, and more particularly, to message routing in a publish/subscribe system using a distributed hash table (DHT).

In distributed computing systems, how nodes that have specific data or handle specific tasks may be effectively located is a key of the technology. In conventional technology, a distributed hash table (DHT) may be used to solve the above issue, and may have benefits in autonomy and decentralization, scalability, and fault tolerance. US Pub. 2013/0318222 or U.S. Pat. No. 8,073,978 may serve as reference for related prior art of DHT, for example.

On the other hand, it is known to be beneficial to use distributed computing systems in publish/subscribe systems, especially in the aspect of scalability. For more information, the thesis "A Comparative Study of Pub/Sub Methods in Structured P2P Networks" published by Sebastian Parkitny on 2006 Sep. 27 may be referred to.

SUMMARY

A method of message routing is provided, wherein the method is implemented by a computer device. In an embodiment of the present invention, method includes coupling to a global ring via a network, wherein the global ring is associated with a distributed hash table (DHT) and includes a plurality of nodes which are divided exclusively into groups in advance. The method may further include determining a first group of nodes from the plurality of nodes divided into groups. The method may also include locating a first node from the first group of nodes as a routing destination for a message to be routed using the DHT.

A system and computer program product relating to the above summarized method are also described and claimed herein, according to embodiments of the present invention.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
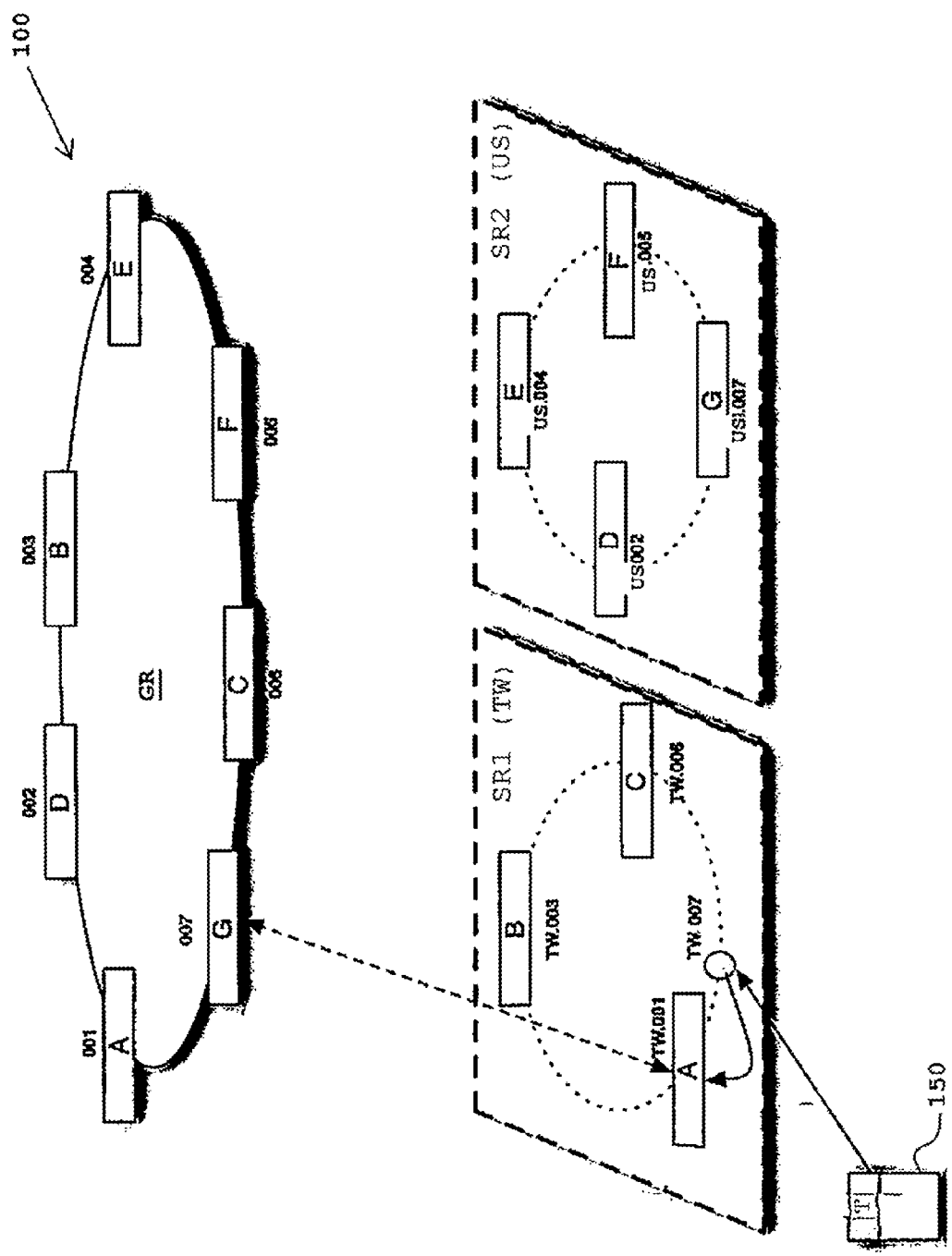
FIG. 1 is a computer system of an embodiment of the invention.

An aspect of the present invention provides a method of message routing in a distributed computing system; more particularly, it may be applied in a publish/subscribe system, but the invention is not limited to applications in publish/subscribe systems.

In conventional distributed computing systems, by using the DHT, tasks are equally distributed to all nodes (i.e., all nodes on the global ring) in addition to the aforementioned benefits. However, it is realized that, equally distributing tasks to all nodes may not be the most efficient practice under certain circumstances. For example, when considering communication latency, distributing tasks according to the locality of the nodes may be a better choice; in other words, allowing nodes physically located in Taiwan to process messages from or to Taiwan may be more efficient than letting nodes physically located in the United States to process such messages.

On the other hand, by using the DHT, it is difficult to make modifications once tasks are distributed to a node. However, it is realized that, in actual circumstances, such as when considering efficiency optimization or responses to sudden incidents (such as submarine communications cable breaks) or natural disasters or responses to temporary large-service requirements generated from a certain area, it might be necessary to redistribute the tasks to another node, and the redistribution may be temporary or permanent. However, prior art fails to provide a mechanism that may easily achieve the above redistribution of tasks among different nodes, especially for dynamic redistribution.

In view of this, an aspect of the present invention provides that all nodes on the global ring are divided exclusively into groups in advance. A device seeking to send a service request message may determine a suitable group according to a predetermined condition, and subsequently locate a node from the group of nodes (in contrast to from all nodes on the global ring) using the DHT of the global ring, wherein the node located from the group preferably satisfies the service request; on the other hand, if the located node is not suitable for satisfying the service request, a proxy node is further designed to assist to locate suitable or predetermined nodes to satisfy the service request from other nodes on the global ring, and the proxy may also be designed using the DHT of the global ring.

In contrast to the conventional practice for a device seeking to send a service request message to locate a node from all nodes on the global ring using the DHT of the global ring, the present invention may preemptively eliminate unfavored nodes on the global ring to effectively enhance efficiency. Furthermore, by still using the DHT of the global ring, the invention may be implemented without making significant modifications to conventional software and hardware in addition to maintaining the advantages of DHT. More particularly, since the present invention extends basing on the DHT of the global ring and does not modify the DHT of the global ring, the grouping of the nodes on the global ring and the subsequent determining of the groups may be dynamically modified according to requirements while the basic operation of the entire system needs not to be modified; moreover, along with the above design of the proxy node, the redistribution of tasks among different nodes may be easily accomplished, which may overcome the shortcomings of prior art.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 5, computer systems/devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<System Architecture>

FIG. 1 shows the hardware architecture of a computer system 100 according to an embodiment of the invention. The computer system 100 is a distributed computing system. Preferably, the computer system 100 is implemented as a global ring GR associated with a distributed hash table (DHT), and may be applied in a publish/subscribe system. For simplification, the computer system 100 in the example of FIG. 1 is composed of 7 nodes A-G. Although not shown, it may be understood that the computer system 100 may comprise more nodes or other network devices. Any two nodes of the computer system 100 are connected by network (not shown) and carry out peer-to-peer communication, wherein the network may be any type of network such as Internet, local area network (LAN), wide area network (WAN), virtual private network (VPN), public switched telephone network (PSTN), or any combination of the above.

In one embodiment, the basic architecture and devices of the nodes A-G may also be implemented as common person computers, servers (such as System X, Blade Center, or eServer of IBM), or appliances (such as IBM WebSphere DataPower Series SOA Appliances or Tivoli ISS Appliances of IBM), but the invention is not limited thereto. In addition, US Pub. 2013/0318222 or U.S. Pat. No. 8,073,978 may serve as reference for global ring architectures and nodes associated with DHT and other information not directly related to the present invention, and the details are not repeated here.

In the example of FIG. 1, under the DHT architecture of the computer system 100, the hash value of the node A is "001", the hash value of the node B is "003", the hash value of the node C is "006", the hash value of the node D is "002", the hash value of the node E is "004", the hash value of the node F is "005", and the hash value of the node G is "007". A key space of each of the nodes A-G on the global ring GR may be determined via these hash values "001" to "007".

More particularly, the nodes A-G are divided exclusively into a first group SR1 composing of the nodes A-C and a second group SR2 composing of the nodes D-G in advance. It may be understood that, in other embodiments, the nodes A-G may be divided into more groups, where each group may comprise one or more nodes, but each node may only belong to one group (such as one of the first group SR1 and the second group SR2).

In one embodiment, the nodes may be divided exclusively into groups according to conditions such as the country, city, or time zone of each node. In another embodiment, the nodes may be divided exclusively into groups according to parameters possessed and detected by each node itself such as IP address, Internet service provider (ISP), operating system, user interface language (such as Chinese or English), device identification code (such as MAC address of the network interface card), hardware efficiency (such as processor frequency or usable space of the storage device), etc.; therefore, once the condition for dividing into groups is determined, each node may determine to which group it belongs by itself.

In the example of FIG. 1, the nodes A-G are divided into groups according to their located country; in this embodiment, as shown in the lower part of FIG. 1, the nodes A-C (the first group SR1) are all located in Taiwan and the nodes D-G (the second group SR2) are all located in the United States. As for the information of the located country, it may be manually inputted to each node, determined by each node according to the allocated IP address, or known by a global positioning system (GPS) at each node; the scheme of acquiring the information is not limited in the invention. For the purpose of illustration, the country of each node is indicated by a country code TW or US in front of the hash value in FIG. 1.

FIG. 1 also shows a computer device 150 sending a service request to the computer system 100. The computer device 150 may be implemented as a specific appliance or a general personal information device installed with specific programs, such as a mobile phone or a tablet. In an embodiment implementing the computer system 100 as a publish/subscribe system, the computer device 150 is used to transmit publish/subscribe messages. In one embodiment, the computer device 150 may have a parameter which could be detected by itself, such as IP address, Internet service provider (ISP), operating system, application program, user interface language, device identification code (such as MAC address of the network interface card, IMEI code, or SIM card code), etc., and the computer device 150 may determine which group of nodes in the computer system 100 to select according to the detected parameter. Further details are described later with FIG. 2 and FIG. 3.

In the embodiment of dividing the nodes A-G into groups according to their located country, the computer device 150 may also maintain information of its located country (the computer device 150 in FIG. 1 is located in Taiwan), and may use the information to determine the country of the group of nodes. As for the information of the located country, it may be manually inputted to the computer device 150, determined by the computer device 150 according to the allocated IP address or phone number, or known by a GPS at the computer device 150; the scheme of acquiring the information is not limited in the invention.

Figure 2:
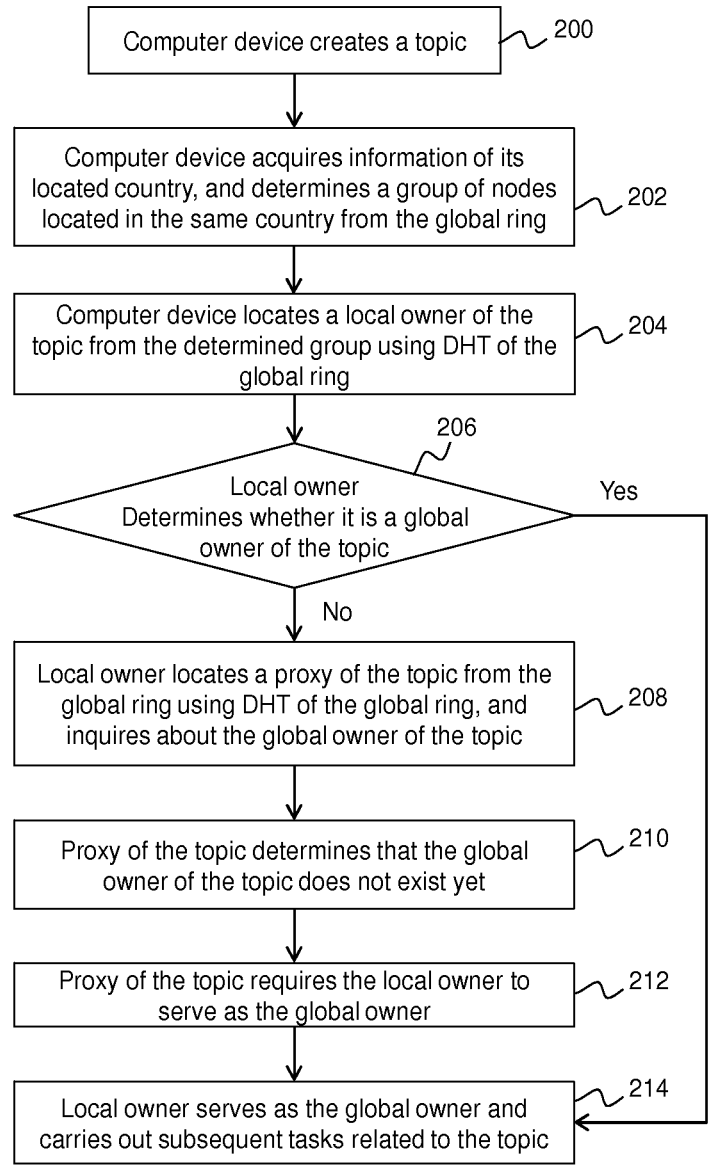
FIG. 2, FIG. 3, and FIG. 4 are flowcharts of methods of embodiments of the invention.
Figure 3:
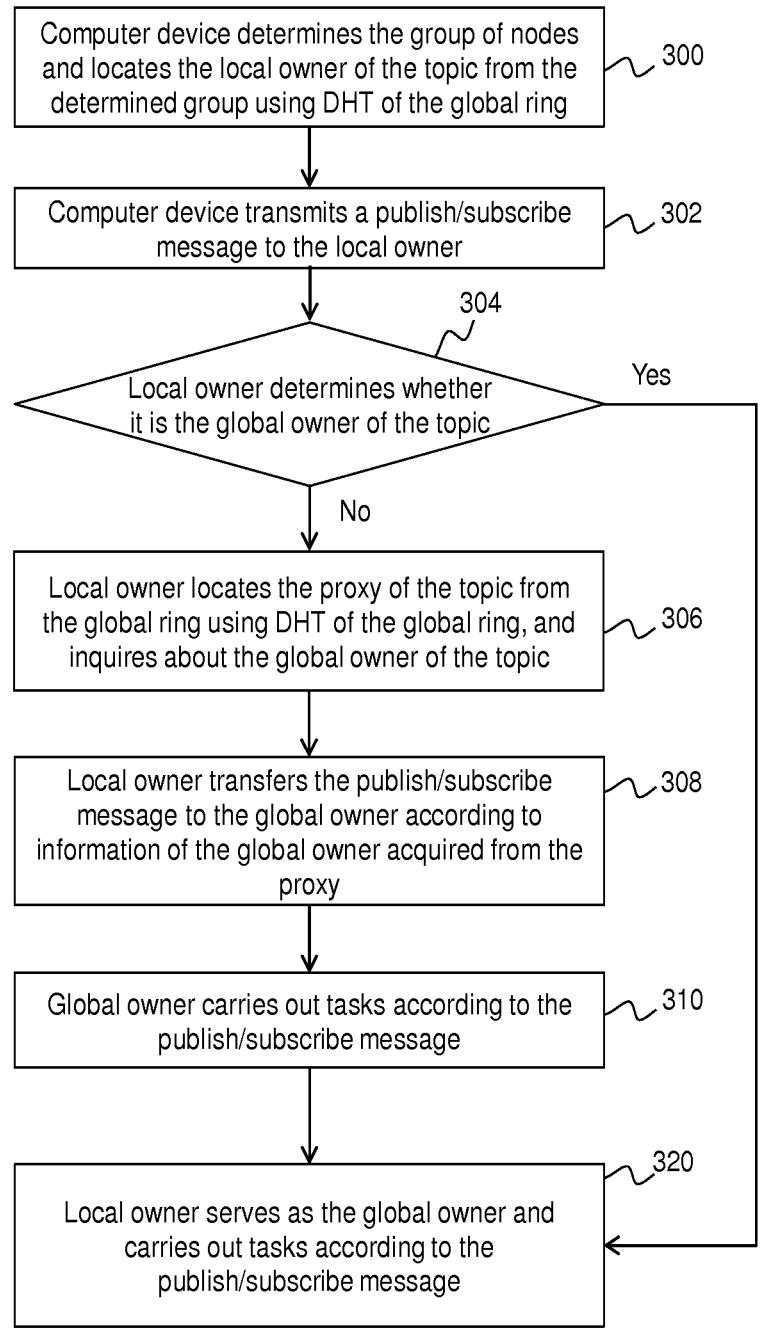
Figure 4:
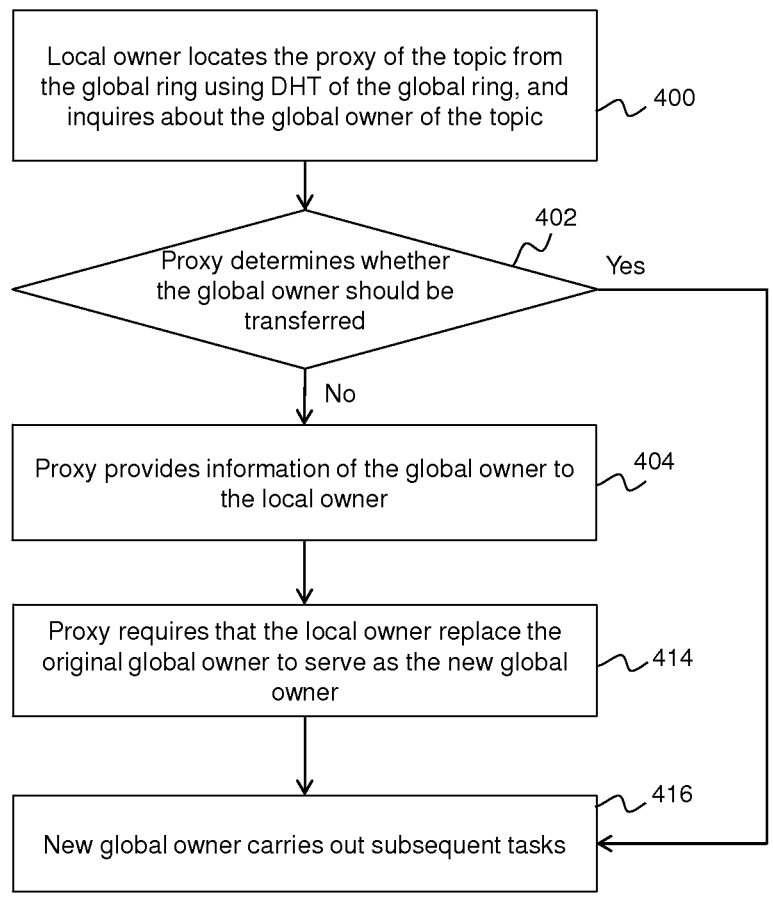

The flow charts in FIG. 2 and FIG. 3 along with FIG. 1 shall be used to further describe the embodiment of the invention applied in a publish/subscribe system, and more particularly, in a topic-based publish/subscribe system. However, those skilled in the art may extend the invention to content-based publish/subscribe systems or distributed computing systems other than publish/subscribe systems according to the disclosure.

Preparation: Local/Global Owner Assignment

Step 200: the computer device 150 creates a topic T.

Step 202: the computer device 150 acquires information of its located country, and accordingly determines among one of the nodes A-C (the first group SR1) and the nodes D-G (the second group SR2). In this embodiment, the computer device 150 is located in Taiwan while the first group SR1 is also located in Taiwan and the second group SR2 is located in the United States; therefore, considering, for example, the geographical proximity between the computer device 150 and the first group SR1 and the second group SR2, the first group SR1 (i.e., the nodes A-C) located in Taiwan is determined by the computer device 150. It may be understood that, if the computer device 150 is located in Japan which is closer to Taiwan, the first group SR1 located in Taiwan is also determined; if the computer device 150 is located in Canada which is closer to the United States, the second group SR2 located in the United States is determined.

Step 204: the computer device 150 carries out hash computation of the topic T created in Step 200 using the DHT of the global ring GR of the computer system 100 to obtain an address value, and a node is located from the first group SR1 (i.e., the nodes A-C) according to the address value to serve as a local owner of the topic T in the first group SR1; a message of creating the topic T is routed to the local owner to proceed to Step 206 subsequently.

It should be noted that, the nodes A-C in the first group SR1 still use hash values obtained by using the DHT of the global ring GR (i.e., the hash value of the node A is 001, the hash value of the node B is 003, and the hash value of the node C is 006) as the addresses; however, since the nodes A-C of the first group SR1 were determined and the nodes D-F of the second group SR2 were neglected in Step 202, the key spaces corresponding to the nodes A-C in this step are different from the key spaces corresponding to the nodes A-C under the global ring GR so as to ensure that the computer device 150 locates a node from the nodes A-C by all means in this step.

For instance, if the computer device 150 carries out hash computation of the topic T using the DHT of the global ring GR to obtain an address value of "007", such is the address of the node G (its hash value is "007") on the global ring GR; however, in Step 204, the computer device 150 only locates from the first group SR1 (i.e., the nodes A-C) and not from the entire global ring GR; therefore, the computer device 150 locates the closest next node in the first group SR1 according to the address value of "007" of the topic T, which is the node A (its hash value is "001"), and the node A shall serve as the local owner of the topic T in the first group SR1.

Step 206: the node A serving as the local owner of the topic T in the first group SR1 carries out hash computation of the topic T using the DHT of the global ring GR to obtain an address value after receiving the message of the computer device 150 creating the topic T, so as to determine whether the node A may also serve as a global owner of the topic T on the global ring GR. The tasks carried out by the global owner shall be described in Step 214 subsequently.

If the hash address value of the topic T falls into the key space of the node A on the global ring GR, the node A serving as the local owner of the topic T in the first group SR1 is determined to also serve as the global owner of the topic T on the global ring GR, and the flow proceeds to Step 214; if not, the flow proceeds to Step 208.

Step 208: if the hash address value of the topic T is, for example, "007", which does not fall into the key space of the node A on the global ring GR and falls into the key space of the node G on the global ring GR instead, then the node G serve as a proxy of the topic T on the global ring GR. The node A subsequently inquires the node G serving as the proxy whether the global owner of the topic T on the global ring GR has been assigned; the flow proceeds to Step 210.

Step 210: since the hash address value of the topic T falls into the key space of the node G on the global ring GR, the node G is designed to be the proxy on the global ring GR, and records the global owner of the topic T on the global ring GR and responds to inquiries, from any node, about which node is the global owner of the topic T on the global ring GR. Since the topic T is newly created (Step 200) in this embodiment, the node G determines that the global owner of the topic T on the global ring GR does not exist yet, and requires the node A to serve as the global owner of the topic T on the global ring GR (Step 212) and records accordingly to respond to subsequent inquiries, from any node, about which node is the global owner of the topic T on the global ring GR.

Step 214: the node A serves as the global owner of the topic T on the global ring GR and carries out subsequent tasks related to the topic T. Taking the publish/subscribe system as an example, the node A maintains a list of subscribers of the topic T and transmits messages published under topic T to all subscribers. In other embodiments, the global owner is the node that satisfies service requests in the global ring GR.

FIG. 2 mainly describes how the global owner of the topic T may be determined in the above, and FIG. 3 shall further describe embodiments of the computer device 150 transmitting messages related to topic T after the global owner of the topic T is determined in below. It should be noted that, the global owner of the topic T may be determined by methods other than that described in FIG. 2 without affecting the flow in FIG. 3; in other words, the flow in FIG. 2 is not a necessary prerequisite for the flow in FIG. 3.

Publish/Subscribe Message Routing

Step 300: the computer device 150 selects the first group SR1 from the nodes A-C (the first group SR1) and the nodes D-G (the second group SR2), and locates the local owner (such as the node A of the first group SR1) of the topic T in the selected first group SR1. For the details, Step 202 and Step 204 in above maybe referred to.

Step 302: the computer device 150 transmits a publish/subscribe message with the topic T and routes the message to the node A located in Step 300 to proceed to Step 304.

Step 304: after the node A serving as the local owner of the topic T in the first group SR1 receives the publish/subscribe message with the topic T transmitted from the computer device 150, the node A determines whether it already is the global owner of the topic T itself; if so, the flow proceeds to Step 320, and the node A serves as the global owner of the topic T on the global ring GR, and updates the list of subscribers of the topic T according to the content of the publish/subscribe message transmitted from the computer device 150 or transmits the message to all subscribers; if not, the flow proceeds to Step 306.

Step 306: the node A serving as the local owner of the topic T in the first group SR1 carries out hash computation of the topic T using the DHT of the global ring GR to obtain an address value and locates, for example, the node G to inquire for the global owner of the topic T on the global ring GR. It should be noted that the node G is designed as the proxy of the topic T on the global ring GR and records the global owner of the topic T on the global ring GR (regardless of how the global owner of the topic T is determined), and responds to inquiries, from any node, about which node is the global owner of the topic T. In this step, the node A may know the address of the global owner (e.g., the node D) of the topic T from the node G, and the flow proceeds to Step 308.

Step 308: after the node A knows the address of the global owner (e.g., the node D) of the topic T, the publish/subscribe message with the topic T transmitted from the computer device 150 (refer to Step 302) is transferred to the node D; subsequently, the flow proceeds to Step 310, and the node D updates the list of subscribers of the topic T according to the content of the publish/subscribe message or transmits the message to all subscribers.

On the other hand, in FIG. 3 (Step 306) in above, the concept of proxy was introduced to record the global owner of the topic T on the global ring GR. More particularly, the proxy may be uniquely determined by carrying out hash computation of the topic T and does not change easily. On the contrary, the global owner of the topic T on the global ring GR may be arbitrarily or dynamically transferred according to requirements, as shown in the flow in FIG. 4 in below. However, the flow in FIG. 3 is not a necessary prerequisite for the flow in FIG. 4.

Global Owner Transfer

Step 400: in this embodiment, it is assumed that the node A is the global owner of the topic T on the global ring GR. In addition, according to the description of FIG. 3 in above, it may be understood that if there is another computer device (not shown) located in the United States, it may similarly locate the local owner (such as the node E) of the topic T in the second group SR2 from the second group SR2 also located in the United States. Since the proxy (such as the node G) has recorded the global owner of the topic T, the node E inquires the node G for the global owner of the topic T at present.

Step 402: when the node G receives the inquiry from the local owner in the second group SR2, the node E, about the global owner, the node G can determine whether the global owner should be transferred at this moment. The determination may be based on various parameters detectable by the node G or commands transmitted from a system manager, and the scheme of determination is not limited in the invention. In a preferred embodiment, the node G may determine whether to transfer the global owner from the node A to the node E or not according to the number of inquiries from the node E about the global owner (which may represent the number of service connections from the located country of the node E) in a given time. If this step determines not to transfer the global owner, the flow proceeds to Step 404 and the node G provides the address of the global owner, the node A, to the node E, as like in Step 306 in FIG. 3. If Step 402 determines to transfer the global owner, the flow proceeds to Step 414.

Step 414: the node G serving as the proxy communicates with the node A and the node E to require that the node E replace the node A to serve as the global owner, and provides the address of the node E to the node A so as to require the node A to transfer information acquired when serving as the global owner (such as the list of subscribers) to the new global owner, the node E, and the record is updated to respond to subsequent inquiries about which node is the global owner.

Step 416: the node E serves as the global owner and carries out subsequent tasks.

Figure 5:
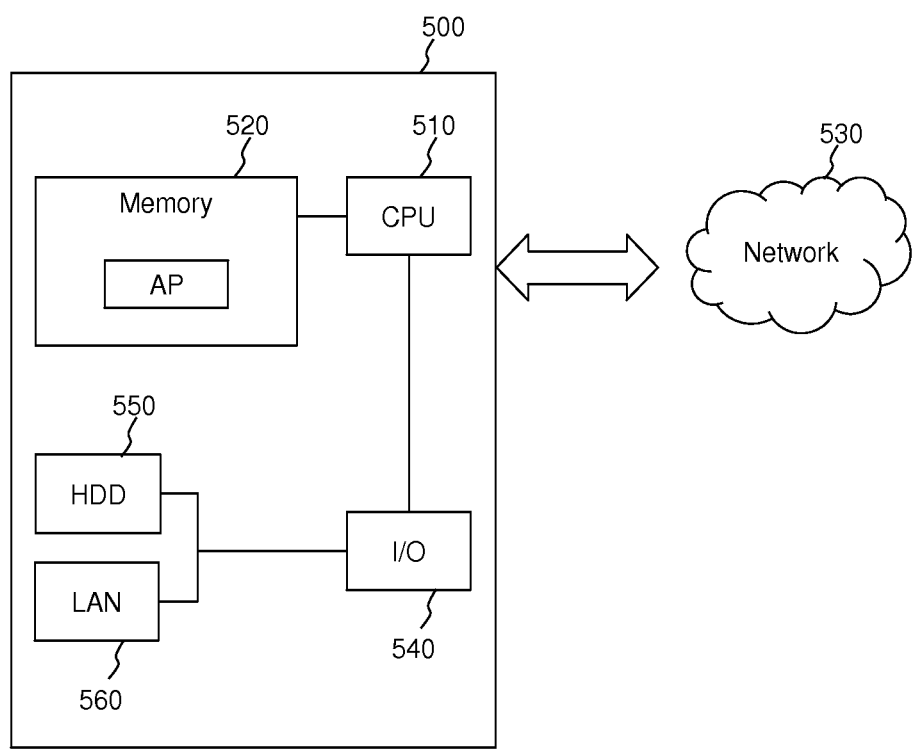
FIG. 5 is a hardware environment block diagram of a computer device or a node of an embodiment of the invention.

FIG. 5 further shows a hardware environment block diagram of an appliance 500, which may serve as the computer device 150 or the nodes A-G in FIG. 1.

In one embodiment, the appliance 500 has a processor to execute dedicated application programs; a storage device to save various information and program codes; a communication and input/output device to act as an interface for users to communicate with; and peripheral devices or other specific usage devices. In other embodiments, the present invention may also be implemented with other forms and have more or less apparatuses or devices.

As shown in FIG. 5, the appliance 500 may have a processor 510, a memory 520, and an input/output (I/O) unit 540. The I/O bus may be a high-speed serial bus such as a PCI-e bus, yet other bus architectures may also be used. Other connections to the I/O bus may be connected directly to the devices or through expansion cards. The I/O unit 540 may also be coupled to a hard disk 550 or a local area network (LAN) adaptor 560. By the LAN adaptor 560, the appliance 500 may communicate with other computer devices through a network 530. The network 530 may be implemented with any type of connection including static LAN connections or wide area network (WAN) connections or dialup networking by Internet service providers; the connection scheme is also not limited and may include wired or wireless connections such as communications with user computers by wireless networks of GSM or Wi-Fi. However, it should be understood that other hardware and software components (such as additional computer systems, routers, firewalls, etc.) may be included in the network despite not being shown in the figures. The memory 520 may be a random access memory (RAM), a read-only memory (ROM), or an erasable programmable read-only memory (EPROM or Flash memory). The memory 520 is used to save an operating system, program codes of a dedicated main program AP, and all kinds of information. The operating system is executed on the processor 510 and coordinates and provides control of various devices in the appliance 500; the processor 510 may access the memory 520 to execute the main program AP.

Those skilled in the art may understand that the hardware of the appliance 500 in FIG. 5 may have various modifications according to different embodiments. Other internal hardware or peripheral devices such as Flash ROM, equivalent non-volatile memory, optical drive, etc. may be added to or replace the hardware shown in FIG. 5.

The present invention can be embodied in any other specific manners without departing from the spirit or essential features of the present invention. Every aspect of the aforesaid embodiments of the present invention must be deemed illustrative rather than restrictive of the present invention. Hence, the scope of the present invention is defined by the appended claims instead of the above description. All equivalent meanings and scope which fall within the appended claims must be deemed falling within the scope of the appended claims.

What is claimed is:

1. A method of message routing, wherein the method is implemented by a computer device and includes:
    coupling a plurality of nodes to a global ring via a network, wherein the global ring is associated with a distributed hash table (DHT), and wherein the plurality of nodes are divided exclusively into groups in advance;
    determining a first group of nodes from the plurality of nodes is divided into groups;
    determining a second group of nodes from the plurality of nodes is divided into groups;
    receiving a plurality of messages from a plurality of subscriber computers;
    locating a local owner associated with a first node from the first group of nodes as a routing destination for the messages to be routed using the DHT;
    determining that the first node is geographically distant from the plurality of subscriber computers; and
    transferring the routing destination for the received plurality of messages to an owner for a second node, wherein the second node is geographically closer to the plurality of subscriber computers than the first node.

2. The method of claim 1, wherein the first group of nodes is determined from the plurality of nodes divided into groups according to a parameter of the computer device, and wherein the second group of nodes is determined from the plurality of nodes divided into groups according to a parameter of the computer device.

3. The method of claim 2, wherein the parameter includes an identification code assigned to the computer device in the network.

4. The method of claim 2, wherein the parameter includes a device identification code of the computer device.

5. The method of claim 2, wherein the parameter includes a geographical location information of the computer device detected by itself.

6. The method of claim 5, wherein the plurality of nodes are divided into groups in advance according to geographical location, wherein the first group of nodes is determined according to geographical proximity between the computer device and each group of nodes, and wherein the second group of nodes is determined according to geographical proximity between the computer device and each group of nodes.

7. A computer program product of message routing, the computer program product comprising:

the one or more computer-readable storage devices and program instructions stored on at least one of the one or more computer-readable storage devices, the program instructions executable by a processor, the program instructions comprising:

coupling a plurality of nodes to a global ring via a network, wherein the global ring is associated with a distributed hash table (DHT), and wherein the plurality of nodes are divided exclusively into groups in advance;

determining a first group of nodes from the plurality of nodes is divided into groups;

determining a second group of nodes from the plurality of nodes is divided into groups;

receiving a plurality of messages from a plurality of subscriber computers;

locating a local owner associated with a first node from the first group of nodes as a routing destination for the messages to be routed using the DHT;

determining that the first node is geographically distant from the plurality of subscriber computers; and transferring the routing destination for the received plurality of messages to an owner for a second node, wherein the second node is geographically closer to the plurality of subscriber computers than the first node.

8. The computer program product of claim 7, wherein the first group of nodes is determined from the plurality of nodes divided into groups according to a parameter of the computer device, and wherein the second group of nodes is determined from the plurality of nodes divided into groups according to a parameter of the computer device.

9. The computer program product of claim 8, wherein the parameter is an identification code assigned to the computer device in the network.

10. The computer program product of claim 8, wherein the parameter includes a device identification code of the computer device.

11. The computer program product of claim 8, wherein the parameter includes a geographical location information of the computer device detected by itself.

12. The computer program product of claim 11, wherein the plurality of nodes are divided into groups in advance according to geographical location, wherein the first group of nodes is determined according to geographical proximity between the computer device and each group of nodes, and wherein the second group of nodes is determined according to geographical proximity between the computer device and each group of nodes.

* * * * *